(12) United States Patent
Keng

(10) Patent No.: US 7,904,798 B2
(45) Date of Patent: Mar. 8, 2011

(54) METHOD OF GENERATING A PRESENTATION WITH BACKGROUND MUSIC AND RELATED SYSTEM

(75) Inventor: Shih-Ling Keng, Taipei (TW)

(73) Assignee: CyberLink Corp., Hsin-Tien, Taipei Hsien (TW)

( * ) Notice: Subject to any disclaimer, the term of this patent is extended or adjusted under 35 U.S.C. 154(b) by 876 days.

(21) Appl. No.: 11/838,218

(22) Filed: Aug. 13, 2007

(65) Prior Publication Data
US 2009/0049371 A1    Feb. 19, 2009

(51) Int. Cl.
*G06F 17/00* (2006.01)
*G06F 3/00* (2006.01)

(52) U.S. Cl. .......................... 715/203; 715/730
(58) Field of Classification Search ............. 715/201, 715/202, 203, 209, 730, 731, 732
See application file for complete search history.

(56) References Cited

U.S. PATENT DOCUMENTS

| | | | | |
|---|---|---|---|---|
| 5,519,684 A * | 5/1996 | Iizuka et al. | ............ | 369/93 |
| 6,001,013 A * | 12/1999 | Ota | ............ | 463/7 |
| 6,235,979 B1 * | 5/2001 | Yanase | ............ | 84/477 R |
| 6,362,411 B1 * | 3/2002 | Suzuki et al. | ............ | 84/626 |
| 6,639,141 B2 * | 10/2003 | Kay | ............ | 84/609 |
| 6,975,995 B2 * | 12/2005 | Kim | ............ | 704/278 |
| 7,326,846 B2 * | 2/2008 | Terada | ............ | 84/609 |
| 7,500,176 B2 * | 3/2009 | Thomson et al. | ............ | 715/202 |
| 7,730,414 B2 * | 6/2010 | Najdenovski | ............ | 715/765 |
| 2003/0160944 A1 * | 8/2003 | Foote et al. | ............ | 352/1 |
| 2004/0027369 A1 * | 2/2004 | Kellock et al. | ............ | 345/716 |
| 2005/0123886 A1 * | 6/2005 | Hua et al. | ............ | 434/307 A |
| 2005/0211072 A1 * | 9/2005 | Lu et al. | ............ | 84/612 |
| 2006/0204214 A1 * | 9/2006 | Shah et al. | ............ | 386/54 |
| 2008/0053293 A1 * | 3/2008 | Georges et al. | ............ | 84/609 |
| 2008/0168390 A1 * | 7/2008 | Benyamin | ............ | 715/810 |
| 2008/0215979 A1 * | 9/2008 | Clifton et al. | ............ | 715/716 |
| 2009/0223350 A1 * | 9/2009 | Osada | ............ | 84/609 |

FOREIGN PATENT DOCUMENTS

WO    2004068495 A1    8/2004

OTHER PUBLICATIONS

Chen, Jun-Cheng, et al, "Tiling Slideshow", Graduate Institute of Networking and Multimedia, National Taiwan University, Proceedings of the 14th Annual ACM International Conference on Multimedia, 2006, ISBN: 1-59593-447-2, pp. 1-10.*

Wang, Jinjun, et al, "Automatic Generation of Personalized Music Sports Video", Proceedings of the 13th Annual ACM International Conference on Multimedia, Nov. 2005, pp. 735-744.*

* cited by examiner

*Primary Examiner* — Laurie Ries

(74) *Attorney, Agent, or Firm* — Winston Hsu; Scott Margo

(57) ABSTRACT

To improve precision when generating multimedia presentations synchronized to background music, number of beats of the background music is determined. The beats of the background music are grouped to form presentation segments, and digital images are assigned to the presentation segments. Presentation display templates that further segment display of the digital images for synchronization with beats of the background music are also provided.

12 Claims, 7 Drawing Sheets

| Image 1 | Image 2 | ............ | Image 83 |
| | | | Image 84 |
| | Image 3 | | Image 85 |
| | | | : |
| | Image 4 | | Image 90 |
| Template 4B1I | Template 6B3I | | Template 8B8I |
| Segment 201 | Segment 202 | | Segment 250 |

METHOD OF GENERATING A PRESENTATION WITH BACKGROUND MUSIC AND RELATED SYSTEM

BACKGROUND OF THE INVENTION

1. Field of the Invention

The present invention relates to methods of generating multimedia presentations, and more particularly, to a method and related system for generating a presentation according to number of beats in background music.

2. Description of the Prior Art

Multimedia technology is rapidly advancing, bringing levels of digital media integration previously unseen and unheard of. Images, text, and video clips are set to music to generate presentations that stimulate clear communication with their audience. And, as networking technology is improving, with increased available bandwidth and better compression, access to higher-quality multimedia content is becoming ubiquitous through the Internet.

Production of such multimedia presentations is often performed within a multimedia presentation development environment. The development environment allows a presentation designer to add, modify, coordinate, or delete the music files, digital images, video clips, and text that go into their presentation on-the-fly, while also providing on-demand previews of their work-in-progress.

Please refer to FIG. 1, which is a diagram of a presentation editing interface according to the prior art. One often painstaking aspect of presentation design is arranging display of the digital images, video clips, or text over the course of the digital music. In FIG. 1, the horizontal axis represents time, and the vertical axis shows layers for assigning media. Typically, the designer will assign a start time and an end time to a particular media element, with one or more media elements, e.g. an image, text, or a clip, assigned to each layer, e.g. Layer 1, Layer 2, etc. As shown in FIG. 1, the presentation begins with an element on Layer 1, followed by an element on Layer 2, which is then followed by an element on Layer 3. The elements on Layer 1, Layer 2, and Layer 3 disappear, i.e. are no longer displayed, at the same time. The presentation ends with an element displayed on Layer 70.

The conventional presentation editing interface has a major problem. Namely, it is desirable for the multimedia elements to be assigned to the time axis in correspondence with the rhythm of the music. However, the start time and end time of each element are assigned manually, which means that the designer must alternately assign/modify the start/end times and preview the presentation, listening carefully to make sure that the elements are displayed and disappear at appropriate times. In FIG. 1, only one element is assigned to each layer, but in practice, each layer could have many elements, and the example of seventy layers is within normal expectations for this type of presentation. While the process described above may be reasonable for a small number of elements, as the number of layers and elements increase, matching each element to the music becomes an excessively cumbersome task.

SUMMARY OF THE INVENTION

According to the present invention, a method of generating a presentation with background music comprises determining number of beats of the background music, grouping the beats into at least one presentation segment, and assigning at least one digital image to each presentation segment.

According to the present invention, a presentation system for generating a presentation with matched background music and digital images comprises an audio processor for determining number of beats of the background music, an organizer coupled to the audio processor for grouping the beats into at least one presentation segment, and a user interface coupled to the organizer comprising an assigning unit for assigning at least one digital image to each presentation segment.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
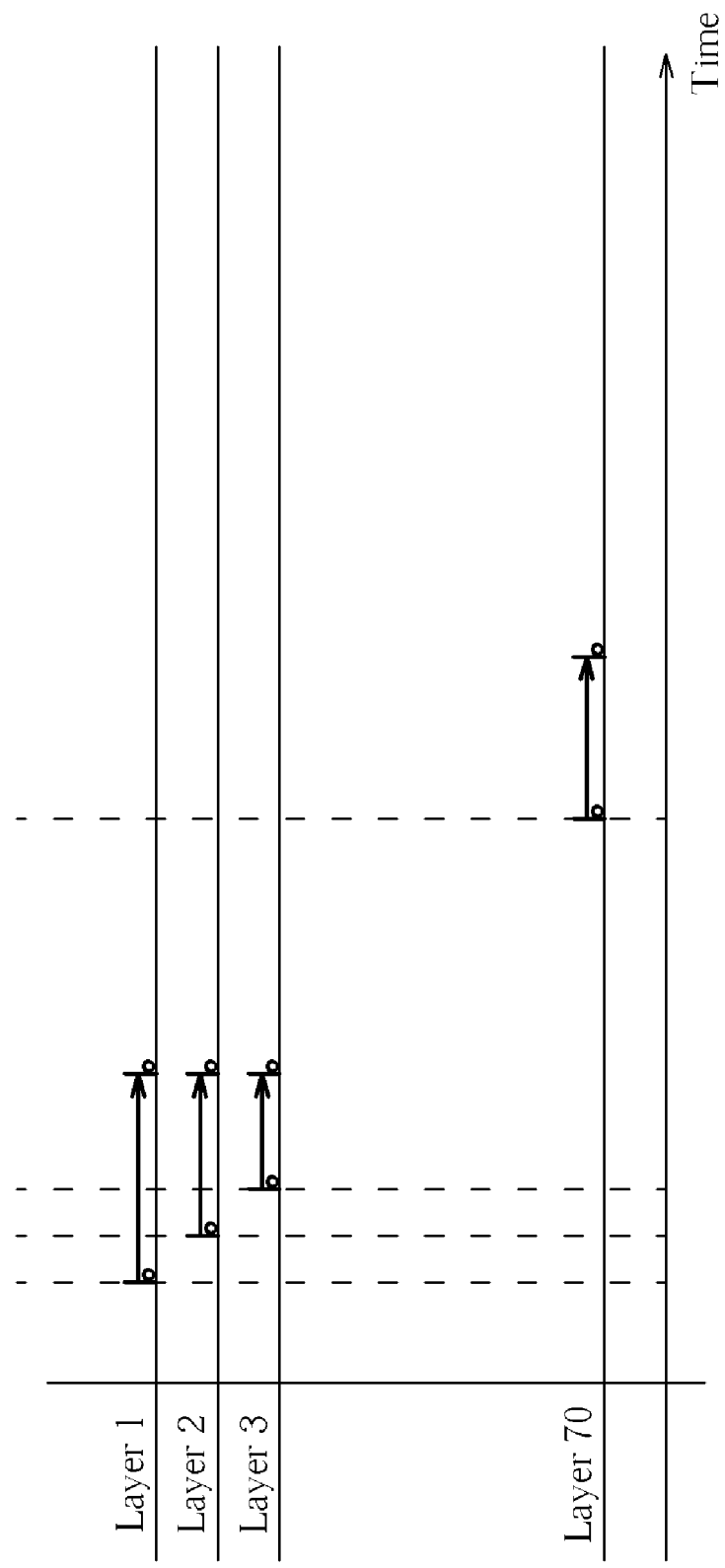
FIG. 1 is a diagram of a presentation editing interface according to the prior art.
Figure 2:
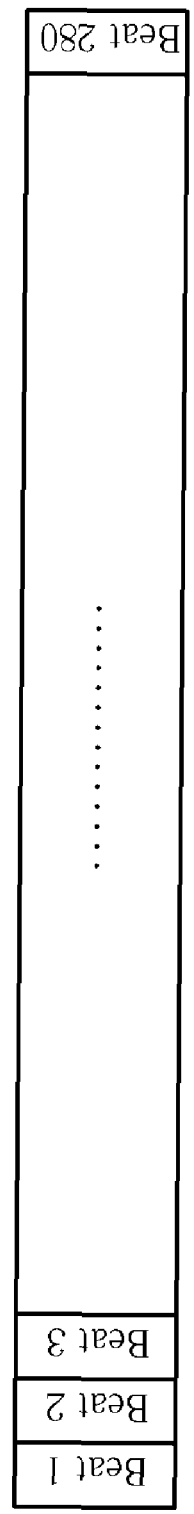
FIG. 2 is a diagram of beat information of music.

Please refer to FIG. 2, which is a diagram of beat information of music. The background music for the presentation is first analyzed through well-known processes to determine the number of beats of the background music. Note that, in other embodiments, background music for the presentation can also be analyzed to determine beats per minute (BPM) or a number of beats per measure. For purposes of explanation, FIG. 2 shows an example of music 20 having 280 beats, indicated as Beat 1, Beat 2, Beat 3, . . . , Beat 280. It should be noted that the present invention can also receive the beats information for the background music through an input device or a definitions file. In other words, the present invention is not limited to utilizing audio processing analysis methods for determining the beats.

Figure 3:
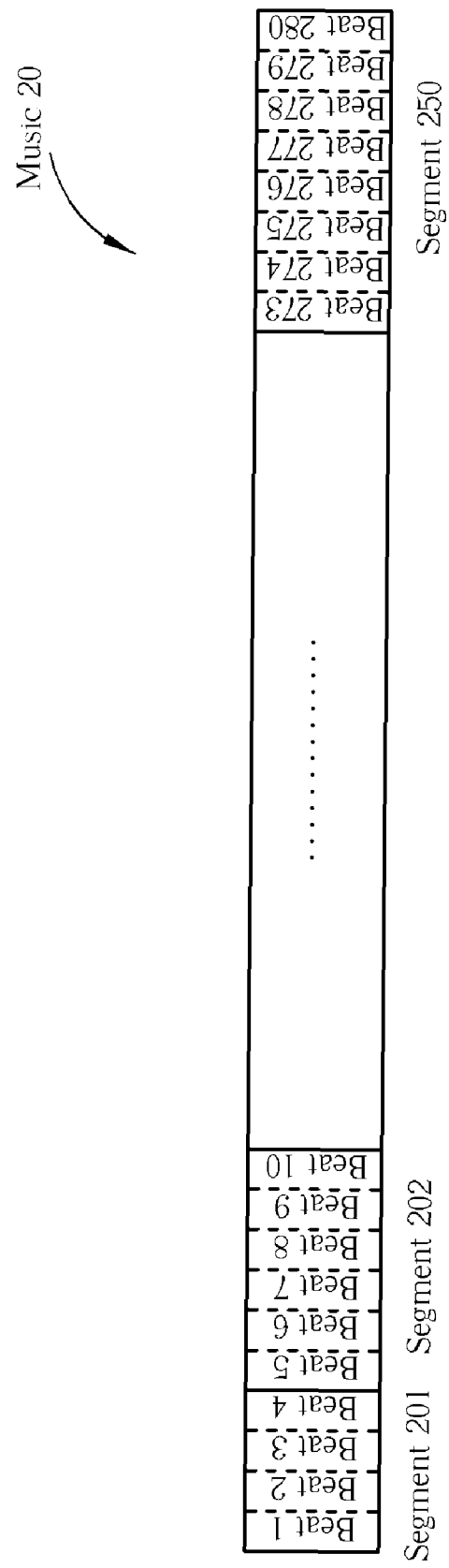
FIG. 3 is a diagram of segmenting the music of FIG. 2 according to the present invention.

Please refer to FIG. 3, which is a diagram of segmenting the music 20 of FIG. 2 according to the present invention. The present invention groups the beats into at least one presentation segment. As shown in FIG. 3, the music 20 is segmented into a first presentation segment 201 having four beats (Beats 1-4), a second presentation segment 202 having six beats (Beats 5-10), and so on. A last presentation segment 250 has eight beats (Beats 273-280). Of course, the music 20 could also be segmented into one segment, i.e. Beats 1-280, but preferably the music 20 is segmented into more than one segment, such as in the example illustrated in FIG. 3. Further, once the music 20 has been segmented, multiple segments can be merged to form longer segments, or one segment can be split to form shorter segments. For example, through a user interface or editing interface, user can select two consecutive segments by an input device such as a mouse and then right click on the segments to choose "combine" mode to merge two segments into a longer one.

Figure 4:
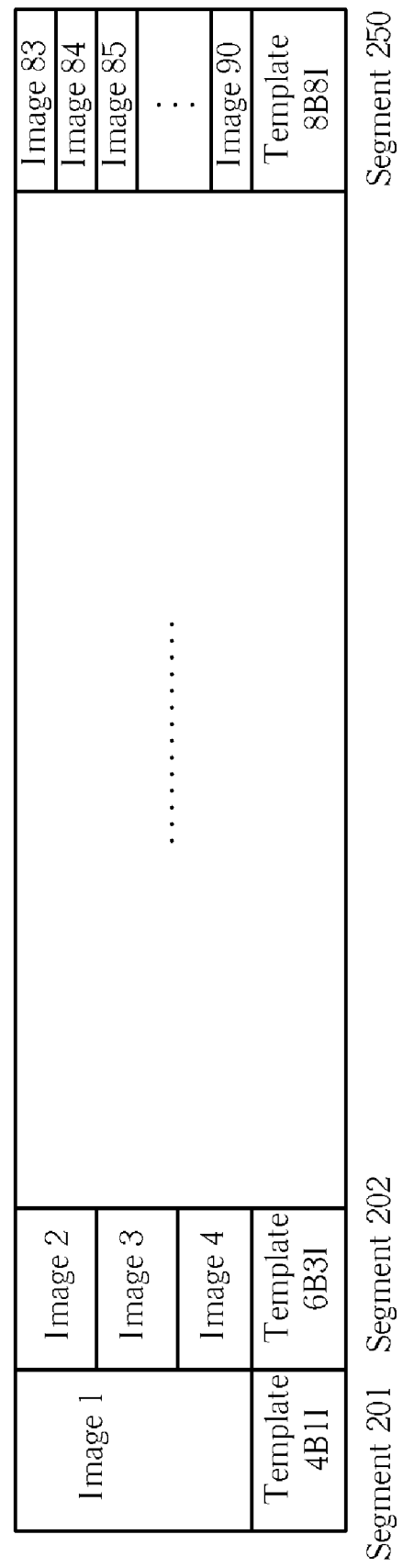
FIG. 4 is a diagram of assigning presentation display templates to the presentation display segments according to the present invention.

Please refer to FIG. 4, which is a diagram of applying presentation display templates to the presentation segments shown in FIG. 3. As shown in FIG. 4, a 4-beat 1-image template 4B1I is applied to the first presentation segment 201, a 6-beat 3-image template 6B3I is applied to the second presentation segment 202, and an 8-beat 8-image template 8B8I is applied to the last presentation segment 250. In general, the presentation display segment of the present invention can be an N-beat K-image template, where N is the number of beats that the presentation display segment is displayed for, and K is the number of images displayed in the presentation display segment.

Please continue to refer to FIG. 4. Finally, a number of digital images matching the number of images in each presentation display template are assigned to each presentation segment to complete the presentation. The digital images assigned to the presentation segments can be assigned automatically given a path to a plurality of digital images, or manually by the designer. If the digital images are assigned automatically, the digital images can be assigned by file name, date according to image metadata, randomly, or by any other characteristic of the digital images. Also, the present invention is not limited to assigning one digital image to each presentation segment, but also includes assigning multiple digital images to each presentation segment.

Figure 5:
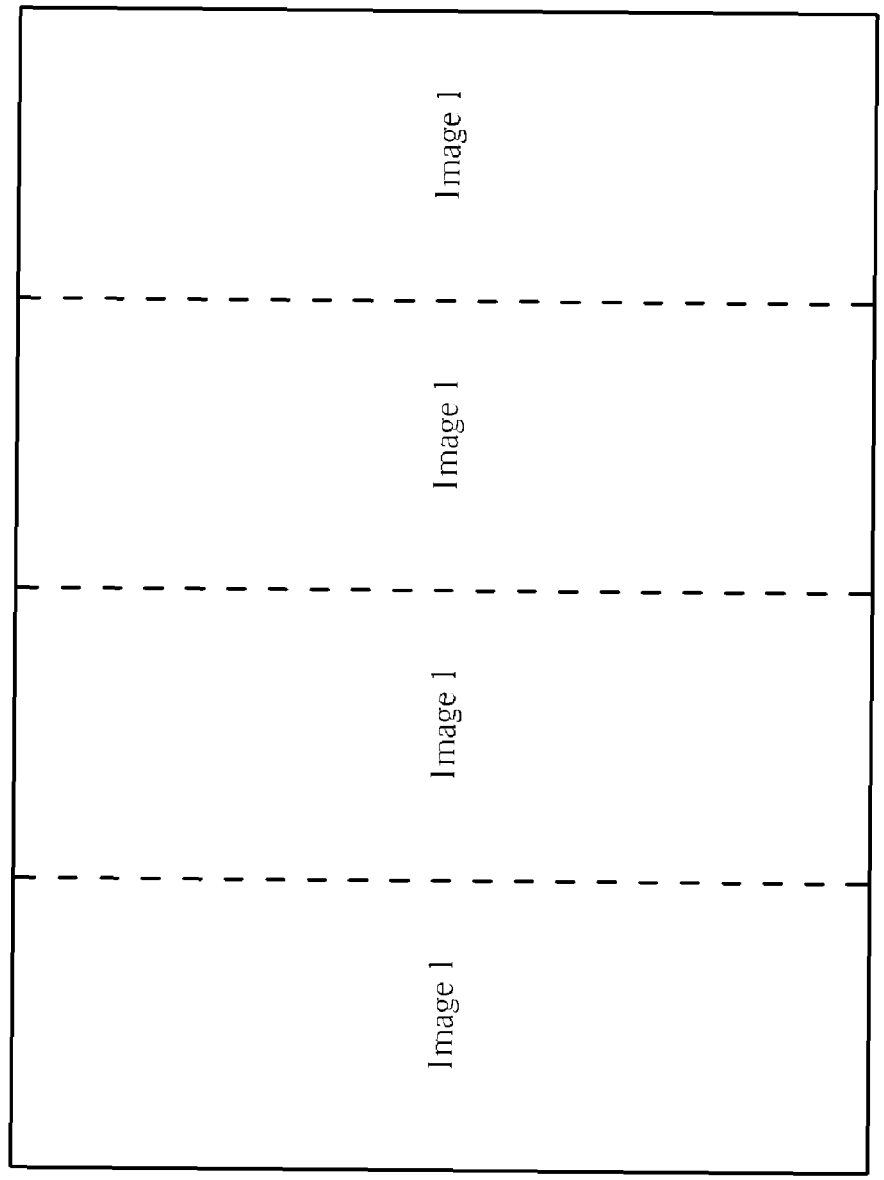
FIG. 5 is a diagram of a presentation display template according to the present invention.
Figure 6:
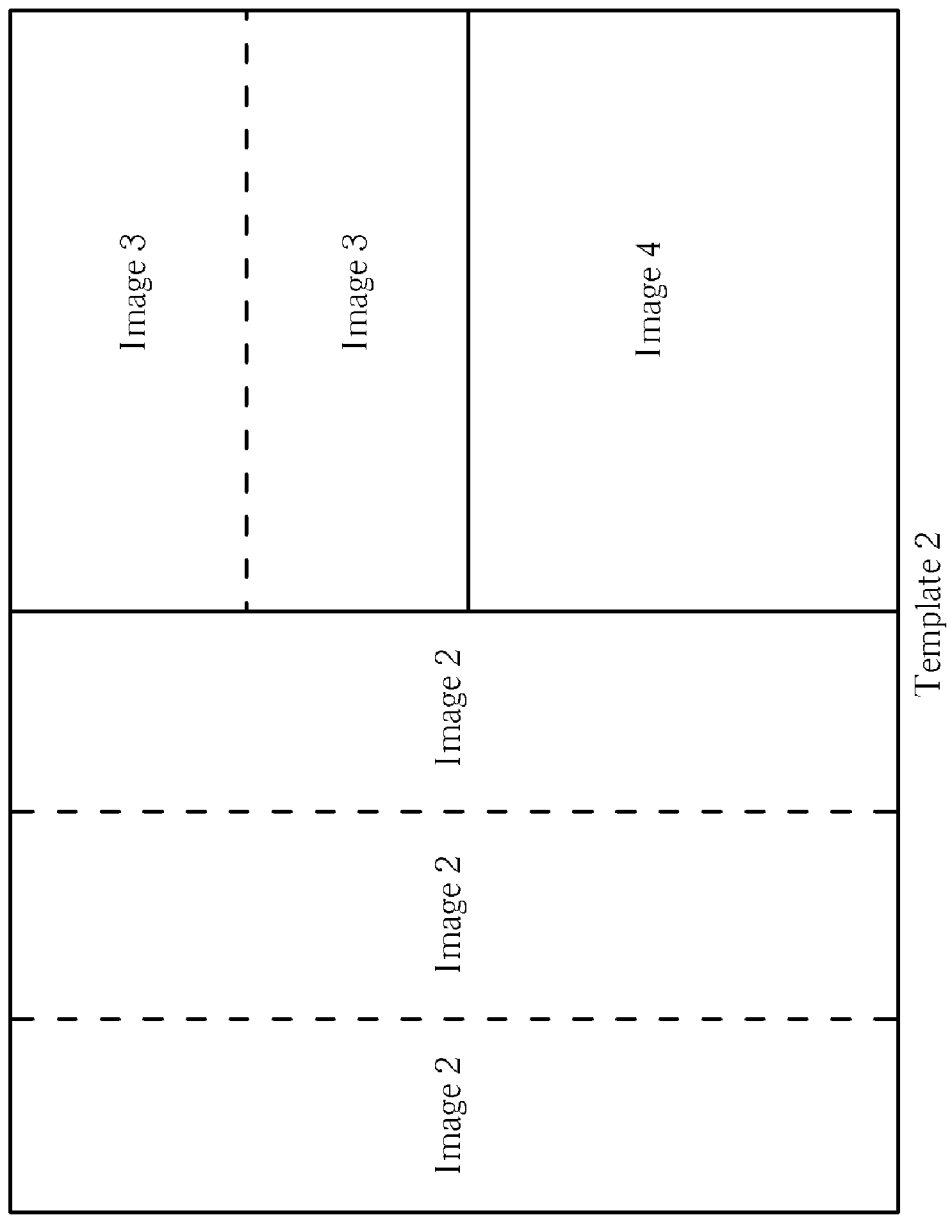
FIG. 6 is a diagram of a second presentation display template according to the present invention.

Please refer to FIGS. 5 and 6, which are diagrams of presentation display templates shown on a display device. Each presentation display template comprises a predetermined digital image arrangement. The template 1 shown in FIG. 5 comprises four sections, and can be seen as the 4-beat 1-image template 4B1I mentioned above. When the digital image (Image 1) is assigned to the template 1 shown in FIG. 5, which is assigned to a presentation segment, such as the first presentation segment 201 in FIG. 2, the user interface or editing interface divides the digital image into four parts that are displayed in sequence with the four beats (Beats 1-4) of the first presentation segment 201. In this way, the designer need only assign a desired digital image to the presentation segment, and the user interface or editing interface will automatically display the digital image in time with the background music according to Template 1 shown in FIG. 5.

Another exemplary default template (Template 2) shown in FIG. 6 comprises six sections, and can be seen as the 6-beat 3-image template 6B3I shown in FIG. 4. As shown, Image 2 is split and displayed in the first three sections (from left to right, and top to bottom), Image 3 is split and displayed in the top right two sections, and Image 4 is also fully displayed in the bottom right section.

Of course, the designer can also assign a template to each presentation segment manually and modify the image arrangement if they are not satisfied with the default template assigned by the user interface or editing interface. For example, the editing interface can further split Image 3 of FIG. 6 into two or more sub-images by right click on Image 3 and select "split to 2" or "split to 3" and etc. And, the number of templates in the editing interface is not limited. The types of templates are also not limited to four-part or six-part templates. Many songs utilize time signatures that would make three-beat, two-beat, or even five-beat presentation display templates preferable. Thus, the number of sections in each template is also not limiting on the present invention.

Finally, the designer can also search for templates based on a number of digital images to be displayed in the presentation segment, and then assign the template to the presentation segment. Then, the designer can input the digital images and select where to display each digital image within the template.

Figure 7:
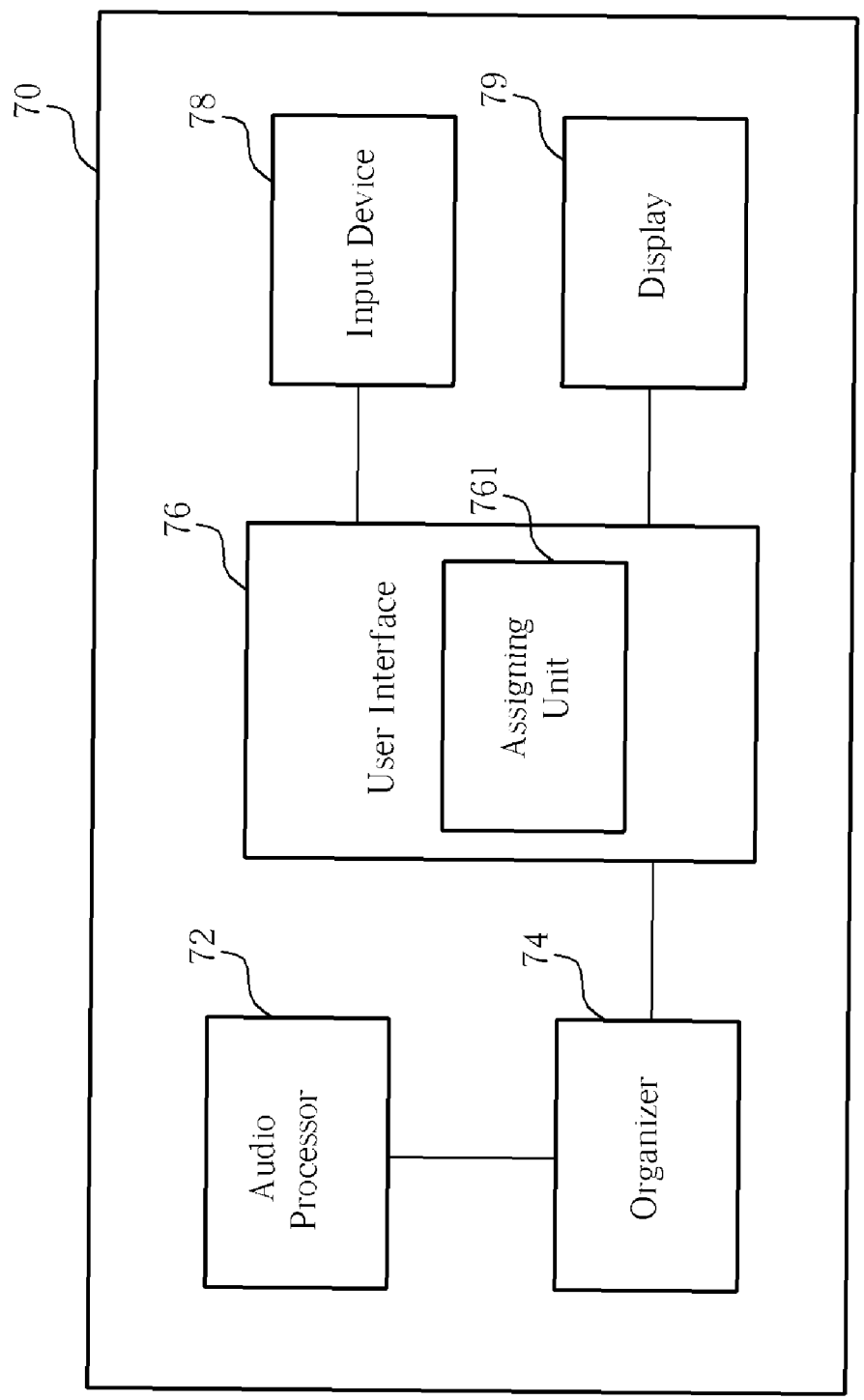
FIG. 7 is a diagram of a presentation system according to the present invention.

Please refer to FIG. 7, which is a diagram of a presentation system 70 according to the present invention. The presentation system 70 is used for generating a presentation with matched background music and digital images. The presentation system 70 comprises an audio processor 72 for determining number of beats of the background music, an organizer 74 coupled to the audio processor 72 for grouping the beats into at least one presentation segment, and a user interface 76 coupled to the organizer 74 comprising an assigning unit 761 for assigning at least one digital image to each presentation segment. The presentation system 70 further comprises an input device 78 coupled to the user interface 76 for a user to provide input to the presentation system 70, and a display device 79 coupled to the user interface 76 for displaying information about the presentation system 70. It should be noted that the user interface 76 is a typical interface for transmitting information between the presentation system 70 and a user, whereas the editing interface mentioned above is a specific type of user interface, or a portion of the user interface 76, which is used particularly for performing editing operations on the presentation, such as selecting templates, merging and splitting presentation segments, etc.

Compared to the prior art, the present invention provides a method of generating a multimedia presentation that is both precise and powerful. The presentation system of the present invention significantly increases the precision of synchronizing display of digital images with background music by automatically corresponding image display with beat information of the background music. This allows the designer to produce more meaningful, higher quality presentations, and even lowers the barrier to entry for less-skilled designers to put together multimedia presentations to share with friends and family.

Those skilled in the art will readily observe that numerous modifications and alterations of the device and method may be made while retaining the teachings of the invention.

What is claimed is:

1. A method of generating a presentation with background music comprising:
   determining number of beats of the background music;
   grouping the beats into at least one presentation segment;
   assigning a presentation display template to the at least one presentation segment according to number of beats of the at least one presentation segment, wherein the presentation display template comprises at least one predetermined digital image arrangement; and
   assigning at least one digital image to each presentation segment, wherein one of the digital images is shown at a predetermined beat of the beats.

2. The method of claim 1 further comprising:
   merging a first presentation segment with a second presentation segment to form a third presentation segment.

3. The method of claim 1 further comprising:
   splitting a first presentation segment to form a second presentation segment and a third presentation segment.

4. The method of claim 1, wherein assigning the at least one digital image to the at least one presentation segment comprises:
   receiving a location of the at least one digital image through an input device; and
   assigning the at least one digital image to the at least one presentation segment according to a predetermined rule.

5. The method of claim 4, wherein the predetermined rule is by file name of the at least one digital images.

6. The method of claim 1 further comprising utilizing audio processing to analyze the background music to determine the number of beats of the background music.

7. The method of claim 1 further comprising receiving the number of beats of the background music through an input device.

8. The method of claim 1 further comprising determining the number of beats of the background music from a definitions file.

9. The method of claim 1, wherein assigning the presentation display template to the at least one presentation segment comprises selecting a default presentation display template from a database.

10. A presentation system for generating a presentation with matched background music and digital images, comprising:
- an audio processor for determining number of beats of the background music;
- an organizer coupled to the audio processor for grouping the beats into at least one presentation segment, and assigning a presentation display template to the at least one presentation segment according to number of beats of the at least one presentation segment, wherein the presentation display template comprises at least one predetermined digital image arrangement; and
- a user interface coupled to the organizer comprising an assigning unit for assigning at least one digital image to each presentation segment.

11. The presentation system of claim 10 further comprising:
- an input device coupled to the user interface for a user to provide input to the presentation system.

12. The presentation system of claim 10 further comprising:
- a display device coupled to the user interface for displaying information about the presentation system.

* * * * *